United States Patent Office 3,406,800
Patented Oct. 22, 1968

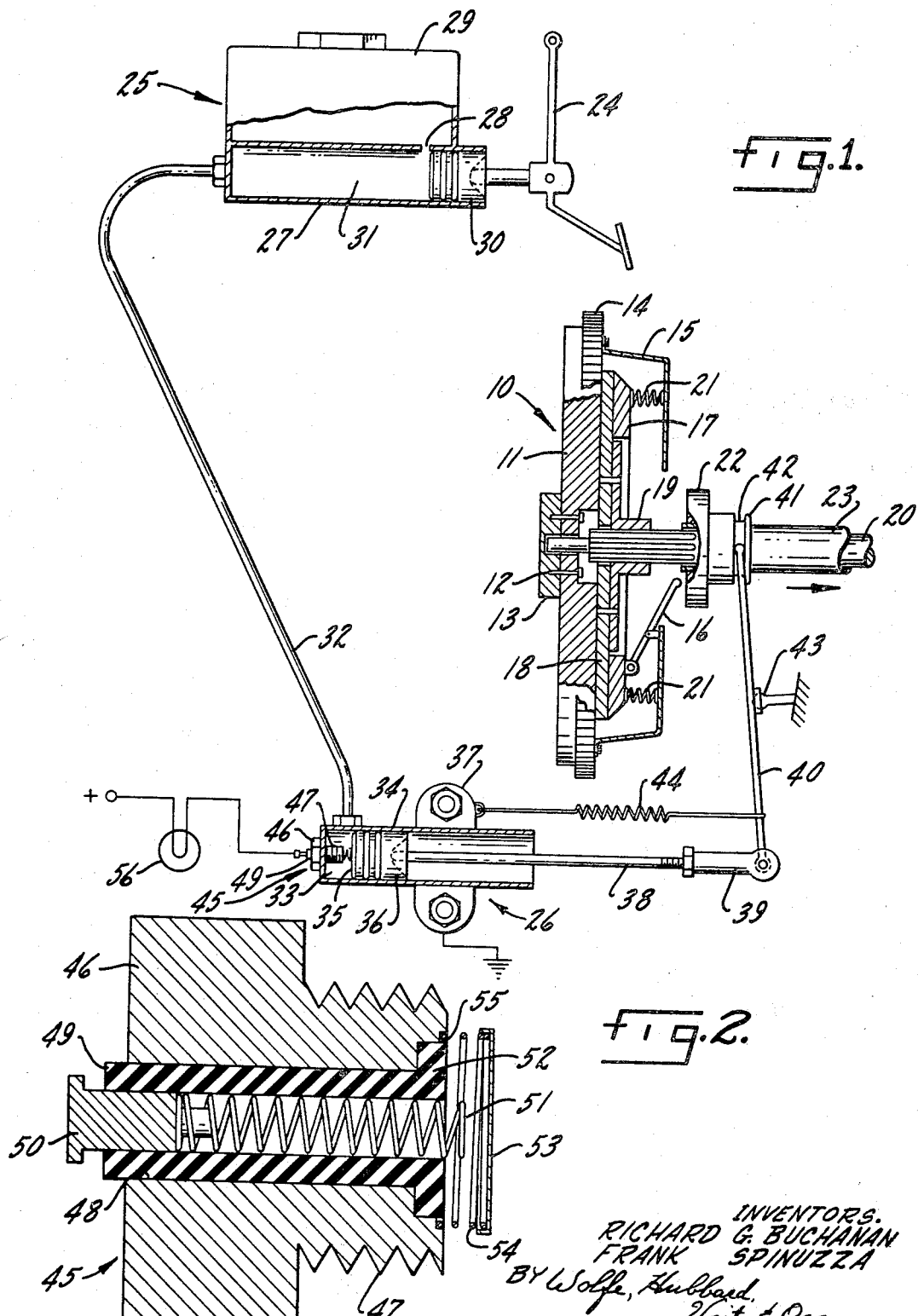

3,406,800
HYDRAULIC CLUTCH WEAR WARNING DEVICE
Richard G. Buchanan, Des Plaines, and Frank Spinuzza, Park Ridge, Ill., assignors to Tel Life Corporation, Park Ridge, Ill., a corporation of Illinois
Continuation-in-part of application Ser. No. 472,894, July 19, 1965. This application Dec. 13, 1966, Ser. No. 616,143
7 Claims. (Cl. 192—91)

ABSTRACT OF THE DISCLOSURE

Device for indicating excessive clutch wear in a hydraulic clutch by detecting excessive forces exerted by clutch springs upon the slave piston, and an electric device on the slave cylinder assembly for sensing such forces.

CROSS REFERENCE TO RELATED APPLICATIONS

This application is a continuation-in-part of prior copending application Ser. No. 472,894 filed July 19, 1965, and now abandoned.

BACKGROUND OF THE INVENTION

The present invention relates generally to hydraulic clutch systems and more particularly to a device for detecting excessive clutch disc wear in a hydraulic clutch system of the type finding particular utility in automotive vehicles.

Operation of conventional mechanical clutches in medium and heavy trucks induces considerable driver fatigue when operation has to be repeated several hundred times a day. As a result, the hydraulic clutch, which requires far less physical effort, has gained great popularity in recent years. Briefly, an hydraulic clutch differs from the conventional clutch in that an hydraulic actuating system is interposed between the clutch pedal operated by the driver and a throw-out means for effecting disengagement of the clutch. The usual hydraulic clutch system includes at one terminal end the fly-wheel which is attached to the crank-shaft of the vehicle's engine and the transmission pilot shaft at the other or output terminal end with the clutch elements including a friction disc interposed between the terminal ends. The friction disc is coupled to the transmission and is sandwiched between the fly-wheel and a pressure plate which, under the influence of strong expansion-type springs, forces the friction disc against the fly-wheel so as to effect driving engagement of the clutch to transmit power from the crank-shaft to rotate the transmission pilot shaft.

The clutch is disengaged by withdrawing the pressure plate against the action of the springs. For this purpose there are usually provided several fulcrumed fingers which are pinned at one end to the pressure plate, with their other end disposed in juxtaposed relation to a throw-out bearing which is slidably mounted on the drive shaft of the vehicle. To disengage the clutch, the throw-out bearing is moved against the fingers, and the latter move the pressure plate against the springs which normally maintain clutch engagement. It is to effect this throw-out bearing movement that an hydraulic system is employed which includes a slave cylinder and piston of which the piston is hydraulically connected to a master cylinder whose associated piston is linked with the foot pedal operated by the driver.

A source of trouble peculiar to hydraulic clutches has been the excessive wear of clutch discs without detection by the driver. Under normal conditions, when the clutch disc has not been excessively worn, the slave piston is urged toward the bottom of the slave cylinder by a pull-back spring. Through an appropriate linkage this also serves to prevent engagement between the throw-out bearing and the pressure plate fingers. As the clutch disc wears, the pressure plate is permitted to move ever nearer the fly-wheel until the pressure plate fingers, which are normally spaced from the throw-out bearing, are caused to press against it. This in turn results in the slave piston being urged closer toward the bottom of the slave cylinder in response to the action of the pressure plate springs. Such excessive clutch disc wear not only permits the clutch assembly to be damaged by the ultimate destruction of the clutch disc but also, through the great force to which the slave cylinder is subjected by the clutch springs, can cause damage to the latter unit as well.

It is therefore an object of this invention to provide a device which will provide a warning that disc wear in hydraulic clutch system is approaching or has become excessive.

It is another object of the invention to provide an improved hydraulic clutch system including means for indicating excessive clutch disc wear.

Is is still another object of the invention to provide a self-contained, minimum force responsive switch finding particular utility in an hydraulic clutch system for detecting the presence of excessive force urging the piston in a hydraulic cylinder toward the bottom of the cylinder so as to forewarn of that condition and permit of timely appropriate corrective action.

BRIEF DESCRIPTION OF THE DRAWINGS

The objects of the invention thus generally set forth, together with other objects and ancillary advantages, are attained by the construction and arrangement shown by way of illustration in the accompanying drawings, in which:

FIG. 1 is a schematic representation of an hydraulic system incorporating the present invention;

FIG. 2 is a longitudinal section through a switch of the type incorporated in the hydraulic clutch mechanism of FIG. 1 and embodying features of the present invention.

While the invention is susceptible of various modifications and alternative constructions, there is shown in the drawings and will herein be described in detail one prefered embodiment. It is to be understood, however, that it is not thereby intended to limit the invention to the specific form disclosed. On the contrary, it is intended to cover all modifications and alternative constructions falling within the spirit and scope of the invention as expressed in the appended claims.

DESCRIPTION OF A PREFERRED EMBODIMENT

Referring to the drawings, there is shown in FIG. 1 a schematic representation of a typical hydraulic clutch system incorporating a preferred form of the invention. The purpose of this figure is to assist in the understanding of the organization and operation of the clutch system generally, and to show the novel and distinctive manner in which operational requirements are met by the invention.

As shown, the clutch assembly 10 includes a fly-wheel 11 fastened by the bolts 12 on flange 13, by means of which a driving connection with the vehicle engine is effected. A ring gear 14 carried by the fly-wheel 11 so as to permit starting of the engine by a starter motor, not shown.

Mounted on fly-wheel 11 is pressure plate cover 15 which in the illustrative clutch assembly supports through fingers 16 (only one of which is shown) a pressure plate 17. Mounted between the fly-wheel 11 and pressure plate 17 is a driven friction disc 18. An internally splined hub 19 is secured to the friction disc 18 and serves to effect a driving connection between the disc and the complementally splined end of a pilot shaft 20 of the vehicle transmission.

The clutch assembly is maintained normally engaged and to this end clutch springs 21, compressed between the pressure plate 17 and the pressure plate cover 15, force the pressure plate against the friction disc 18 so as to frictionally engage it with fly-wheel 11.

For effecting disengagement of the clutch 10 there is provided a thrown-out bearing 22 which is operative in conjunction with the fingers 16 to move the pressure plate 17 against the action of the springs 21. The throw-out bearing is slidably supported on cylindrical guide 23 which is disposed about the transmission pilot shaft 20. The throw-out bearing 22 is moved along its guide 23 toward pressure plate 17 and against the inner ends of fingers 16. The outer ends of the fingers 16 are pinned to pressure plate 17 and they are fulcrumed intermediate their ends to the pressure plate cover 15. As the throw-out bearing is moved against the free of fingers 16, the fingers rock about their fulcrum and withdraw the pressure plate 17 against the force of springs 21. When this occurs, the friction disc 18 is freed from driving engagement with fly-wheel 11 and thus the driving connection between pilot shaft 20 and crank-shaft flange 13 is interrupted.

In the illustrated clutch mechanism an hydraulic system, including a master cylinder assembly 25 having a slave cylinder assembly 26 hydraulically coupled thereto, is interposed between the clutch pedal 24 and the throw-out bearing 22 so as to amplify the force applied to the clutch pedal by an operator. The master cylinder assembly 25 is of the conventional type and includes a master cylinder 27, communicating through port with a fluid reservoir 29, and a master piston 30. The latter is mounted for reciprocation in the master cylinder 27 in response to movement of the clutch pedal 24. When the clutch pedal is depressed, the piston 30 in its corresponding movement first covers the port 28 so as to define a pressure chamber 31 with the walls of master cylinder 27. Pressure chamber 31 communicates through a pressure fluid line 32 with a similar pressure chamber 33 within the slave cylinder assembly 26 as formed by the walls of slave cylinder 34 and the head 35 of slave piston 36. When the clutch pedal 24 is depressed, fluid pressure is applied from the pressure chamber 31 through the line 32 to the pressure chamber 33 of the slave cylinder assembly 26, which is fixed in place by lugs 37 with respect to the clutch assembly 10, thus causing the slave piston 36 to be forced outwardly, away from the bottom end of the slave cylinder 34.

The force of the piston 36 is applied to the throw-out bearing 22 through an appropriate linkage which as shown includes a partially threaded rod 38, clevis 39 and an arm 40. Throw-out bearing 22 is provided with a collar 41 which has a peripheral recess 42 therein for receiving one end of the arm 40. The other end of arm 40 is pinned in the clevis 39. The arm 40 is fulcrumed on a fixed ball stud 43. The clevis 39 receives the threaded outer end of rod 38, and the inner end of the rod 38 is smoothly rounded for seating engagement in a recess formed in the rear of the piston 36. It will be apparent that by adjusting the amount of threaded engagement of the rod 38 into or out of clevis 39 the effective length of the rod can be altered, and through the resulting angular movement of the fulcrumed arm 40, the position of the throw-out bearing 22 is adjusted. This latter affects the amount of separation between the main ends of the pressure plate fingers 16 and throw-out bearing 22 so that normally, when the clutch is engaged, the throw-out bearing 22 is held apart from fingers 16 such spacing being maintained by an appropriate biasing means, here shown as a pull-back spring 44 which is attached to the arm 40.

To disengage the clutch, the clutch pedal 24 is depressed, pressurizing the fluid within pressure chambers 31 and 33 forcing the slave piston 36 to move outwardly—away from the bottom of the slave cylinder 34. Through the threaded rod 38 and clevis 39, the arm 40 is rocked about ball stud 43 against the pull of spring 44, and the throw-out bearing 22 is moved into engagement with the free inner end of fingers 16. Under the urging of the throw-out bearing 22, the fingers 16 rock about their fulcrums, withdrawing the pressure plate 17 against the action of the clutch biasing springs 21, and the friction disc 18 is freed from driving engagement with the fly-wheel 11.

So long as the clutch assembly is properly adjusted and friction disc 18 is not excessively worn, operation of the hydraulic clutch system is quite satisfactory. The hydraulic system is, however, subject to serious damage and possible destruction when there is excessive wear or misadjustment in the clutch. Thus, when properly adjusted, the throw-out bearing 22 is kept out of contact with fingers 16, and only normal disc wear occurs upon engagement and disengagement of the clutch. Additionally, since there is normally no contact between the fingers 16 and the throw-out bearing 22, the clutch springs 21 are not permitted to exert force through the arm 40 and rod 38 upon the slave piston 36, and the latter is urged toward the bottom of the slave cylinder solely by pull-back springs 44.

In contrast, should the friction disc 18 become excessively thinned by wear, the fingers 16 will be rocked so that their inner ends continuously engage the throw-out bearing 22 while the clutch is engaged. Not only does this result in excessive wear of the fingers 16 and of the bearing 22, but it permits the very large force of the clutch biasing springs 21 to be exerted, "in reverse," through fingers 16, the throw-out bearing 22, the arm 40, and rod 38 against piston 36 in addition to the predetermined force exerted on the piston by the pull back springs 44. This additional force can be sufficient, in cases of extreme clutch disc wear, not only to require replacement of the disc 18 but even to necessitate replacement of the slave cylinder assembly 26.

In accordance with the invention, the "reverse" action of the clutch springs is utilized to warn against excessive clutch disc wear by sensing and indicating the presence of their additional force on the piston 36. In carrying out the method of the present invention, therefore, means are provided for sensing when the piston 36 is being urged toward the bottm of the cylinder 34 by the clutch springs 21. Briefly stated, a preferred form of the sensing device includes a first electrical contact mounted on a plug which is inserted in the end of the slave cylinder 34 and a second contract which is so located that it tends to move toward the first contact in response to movement of the piston 36 toward the bottom of the cylinder. The contacts are normally held separate by a yieldable means whose yield point is higher than the force of the biasing spring 44 upon the piston 36 but is lower than the sum of forces exerted upon the piston by the biasing spring 44 and the clutch springs 21. Consequently, when excessive clutch disc wear occurs and the clutch springs exert their additional force upon the piston 36, the yieldable separating means is overcome and the contacts engage. In essence, the switch is a special form of a force responsive means for conditionally conducting current, requiring for its operation a force which is greater than that exerted on the piston by the biasing spring 44 but less that exerted on the piston by the biasing spring and the clutch springs 21 together.

A specific embodiment of the preferred form of the electrical device for detecting excessive clutch disc wear is shown in FIG. 2. Seated in a threaded opening in the bottom of the slave cylinder 34 is a plug 46, preferably of metal. The plug 46 is sealingly held in the threaded opening by a threaded shank 47, although a smooth shank, press fitted in a smooth cylinder opening might also be used. Mounted on the plug 46 is a first electrical contact member shown as a helical spring 51 extending a short distance beyond the end of the plug shank 47. Means are provided for connecting the spring 51 to a circuit outside of the cylinder and in the illustrative embodiment this is done not through the metal of the plug 46 but in isolation therefrom. In particular, the plug 46 has an axial bore 48 through which there extends a hollow insulating sleeve 49. The spring 51 extends through a substantial length of the sleeve 49 where it makes electrical connection with a terminal 50 sealed into but extending from the sleeve 49. For mechanical convenience and to insure a pressure fluid seal upon mounting the insulating sleeve 49, the bore 48 is enlarged at its inner end so as to receive a flanged portion 52 of the sleeve 49. Similarly the terminal 50 is stepped at its inner end to accommodate the spring 51.

Located for movement toward the first contact, the spring 51, in response to movement of the piston 36 toward the bottom of the cylinder 34 is a second contact member, here shown as a cap 53, separated from the spring 51 by a yieldable means such as the helical spring 54 to which the cap 53 may be suitably affixed. To keep the contacts 51 and 53 separated, the axial length of the spring 54 is slightly greater than the length of the protruding end portion of spring 51 so that contact 53 is normally disposed a short distance beyond the end of spring 51 thus rendering the two switch contacts normally open.

In the exemplary embodiment of the invention, with the switch 45 installed in the end of slave cylinder 34 as shown in FIG. 1, the slave cylinder 34 is electrically connected through integral lugs 37 to the negative or ground side of the vehicle's electrical system and contact 53 of the switch 45 is also connected to the vehicle ground through contact spring 54 and plug shank 47.

In accordance with an important feature of the invention, the yield point of the means for keeping the contacts 51 and 53 separated, i.e. the force required to overcome it, is higher than the force of the biasing spring 44 upon the piston 36 but lower than the sum of forces exerted on the piston by the biasing spring 44 and the clutch springs 21. As a result, the separating means, here the spring 54, yields and the contacts 51 and 53 engage only when the piston 36 is additionally urged toward the bottom of the cylinder by the clutch springs 21 i.e. when the clutch disc 18 has worn excessively.

Thus it is seen that the specific example shown in FIG. 2 represents a simple self-contained switch which will reliably sense excessive clutch disc wear by permitting closure of its contacts when and only when the piston of the slave cylinder assembly 26 is urged toward the bottom of the slave cylinder 34 by the clutch springs 21.

It will be understood that while a particular type of switch has been described which is particularly suitable for carrying out the invention, it is nevertheless exemplary only. Other equivalent devices for detecting the presence of the additional force of the clutch springs 21 upon the piston 34 will occur to those skilled in the switch art without departing from the invention. For example, the opening in the bottom of the cylinder 34 might be eliminated and the first contact might be a leaf spring, cantilever mounted on a plug which is inserted through the side of the cylinder near its bottom, with the spring extending diagonally across but closely spaced from the bottom of the cylinder. The second contact might be the bottom of the cylinder itself or a resilient contact supported underneath the first contact by means of an anchor plate seated at the bottom of the cylinder and in electrical contact therewith. The strength of the leaf spring would be such that it would be deflected against the second contact by the piston only when piston is urged toward the bottom of the cylinder by the clutch springs due to excessive clutch wear. The leaf spring would be insulated from the piston as well as from the plug on which it is mounted with an insulated lead extending from the spring through the plug to the outside of the cylinder. The electrical circuit would then be from the lead through the contacts to the cylinder.

Even the particular switch shown in FIG. 2 could be modified in several aspects. For example, instead of a cap, the second contact 53 might be formed simply by crimping the end of the spring 54 inwardly so as to cross the outermost turn of the spring 54 diagonally, substantially in the plane of that turn. Alternatively, the cap might be replaced by a straight, diagonal cross bar member affixed to the end of the spring 54, as by welding. As another alternative, if the piston head 35 is conductive it may constitute the second contact 53.

In the illustrative device, a visual signal in the form of a warning lamp 56, which may be mounted on the dash board of the vehicle is employed to indicate extensive clutch wear. The lamp 56 is conducted between the terminal 50 of the switch 45 and the positive side of the vehicle's electrical system.

So long as the clutch is properly adjusted and the plate 18 is not excessively worn, the lamp 56 never lights. Thus, when the clutch pedal 24 is depressed, slave piston 36 is forced away from the bottom of slave cylinder 34 so as to disengage the pressure plate 17 from friction disc 18 and the contact 53 is free from engagement with the head 35 of the slave piston 36. Similarly, when the clutch pedal is not depressed, the slave piston head 35 rests against contact 53 with a force determined solely by pull-back spring 44. As pointed out previously, the spring 54 which mounts the contact 53 is selected to have a yield point which is higher than the force of pull-back spring 44. In actual practice a difference of two pounds between the spring constants of the springs 44 and 54, with the latter spring being the stiffer, has been found effective to insure that normally the piston head 35 will be urged against the switch contact 53 with a force which is insufficient to move that contact into engagement with the spring 51.

If, however, friction disc 18 is excessively worn or the length of the rod 38 is maladjusted, it is intended that the lamp 56 should remain lighted whenever the clutch pedal 24 is released so as to provide a continuous warning signal that attention is required. Thus, when the clutch friction disc 18 is thinned due to excessive wear, pressure plate 17 is pressed past its normal position by the clutch springs 21 and the free ends of fingers 16 ride continuously on the throw-out bearing 22. As soon as this condition occurs, the force exerted by the springs 21 through fingers 16, throw-out bearing 22, arm 40, clevis 39 and rod 38 upon piston 36 becomes sufficient, together with the force of pull-in spring 44, to overcome the oppositely applied force of switch spring 54 so as to cause contacts 53 and 51 to close. With the switch 45 closed, an electrical circuit is completed from the positive side of the vehicle's electrical system, the lamp 56, the terminal 50, spring contact 51, contact 53 and spring 54, and shank 47 of switch 45, through slave cylinder 34 to the negative or ground side of the vehicle electrical system, and the lamp lights. It will be noted that contacts 51 and 53 close before the piston 36 reaches the inner limit of its travel as determined by the plug shank 47. The contact springs 51 and 54 can then be further compressed by the piston 36 in case the alarm is not heeded immediately, without damage to the cylinder 34.

Misadjustment of rod 38 and clevis 39 will also cause lamp 56 to remain lit and thus to warn of an unsatisfactory clutch condition, when the adjustment is in such a direction as to move the bearing 22 into constant abutment against the fingers 16. This will generally occur when upon initial adjustment of the clutch insufficient clearance is left between the free end of the clutch fingers 16 and the face of throw-out bearing 22. When this occurs, after very little wear on the friction disc 18, springs 21 can exert their force through fingers 16 against the face of throw-out bearing 22 in the manner previously described to force slave piston face 35 with excessive pressure against the switch 45.

From the foregoing it will be apparent that an hydraulic clutch wear warning device constructed in accordance with the teachings of the present invention is inexpensive, and it may be easily installed in clutch assemblies that are already in use simply by installing a slave cylinder appropriately incorporating a clutch wear warning device embodying the teaching of the present invention. Further, it is apparent that the disclosed switch element of the warning device is responsive solely to excessive mechanical force and is unaffected by and non-responsive to changes in fluid pressure within the clutch system, thus precluding the giving of false wear warning due to fluid pressure increase upon actuation of the operator's pedal. Yet the device is effective to afford a warning not only of excessive clutch disc wear but also of misadjustments in the clutch before such wear or misadjustments lead to clutch failure.

We claim as our invention:

1. For use in an hydraulic clutch system having a slave cylinder and a piston mounted for longitudinal movement therein, said piston in its rest position being urged towards the bottom of the cylinder by a biasing force of a first magnitude under normal operating conditions and by an additional force when the system is excessively worn or misadjusted, a self-contained switch for revealing the approach of bottoming of the piston in the cylinder under the urging of said second force, said switch comprising in combination
    (a) a metal plug having
        (1) a threaded shank for reception in an aperture in the bottom of the cylinder, and
        (2) a port extending axially through the plug to provide a passage into said cylinder,
    (b) an insulating sleeve extending within said port,
    (c) a first spring disposed within said sleeve and having one end extending beyond said shank,
    (d) a terminal extending into said sleeve and in electrical contact with said first spring,
    (e) a second spring seated at one end in said shank in electrical contact therewith and having its other end extending towards said piston beyond said shank and said one end of said first spring.
    (f) a metal cap supported on the other end of said second spring in normally spaced relation to said one end of said first spring so as to be thrust into engagement by said piston with said one end of said first spring for establishing an electrical circuit from said plug to said terminal when and only when said piston is urged towards the bottom of said cylinder under the urging of said additional force.

2. In a hydraulic clutch system including a set of clutch springs, the combination comprising
    (a) a slave cylinder and a piston mounted for reciprocation in said slave cylinder,
    (b) spring means coupled to said piston and having a predetermined spring constant for urging said piston in its rest position toward the bottom of the cylinder with a predetermined force under normal operating conditions, said piston in its rest position being additionally urged toward the bottom of the cylinder by the clutch springs when the clutch is excessively worn or misadjusted,
    (c) a first contact resiliently mounted within said cylinder at a distance from the bottom thereof,
    (d) a second electrical contact,
    (e) a spring resiliently supporting said second contact spaced from said first contact between the head of said piston and said first contact so as to be thrust into engagement by said piston with said first contact, said spring having a spring constant such that its biasing force exceeds the force of said biasing spring upon said piston so that the force of said contact supporting spring will be overcome and the contacts will engage only when said piston is additionally urged towards the bottom of the cylinder by said clutch springs,
    (f) means for electrically connecting one of said contacts to said cylinder, and
    (g) means for electrically connecting the other said contact to a point outside said cylinder.

3. A hydraulic clutch system including means for excessive clutch disc wear comprising in combination
    (a) a friction disc and a pressure plate normally biased into engagement by springs,
    (b) a throw-out bearing mounted on a shaft for movement towards and away from said plate,
    (c) a plurality of rockably mounted fingers
        (1) anchored to said plate at one of their ends and having their other end normally held closely spaced from said bearing so that when said bearing is moved towards said pressure plate said fingers rock and separate said pressure plate from said disc against the pressure of said springs,
        (2) said fingers being subject to having their free ends levered by said pressure plate against said bearing under the force of said springs when said friction disc becomes excessively worn,
    (d) a slave cylinder,
    (e) a piston mounted for longitudinal movement in said cylinder and having a head for forming a pressure chamber with the bottom and wall portions of said cylinder,
    (f) a source of pressurized fluid communicating with said pressure chamber for urging said piston into an extended position away from the bottom of said cylinder,
    (g) a connecting rod coupled to said piston,
    (h) a rockably mounted arm operatively connected between said throw-out bearings and said piston connecting rod for forcing said bearing against said fingers when said piston is in its extended position,
    (i) a spring operatively coupled to said arm for rocking said arm so as to maintain said bearing out of contact with said fingers,
    (j) said piston being normally subject to a predetermined biasing force exerted by said spring through said arm and through said rod urging said piston head towards the bottom of said cylinder, said piston also being subject to an additional force urging it towards the bottom of said cylinder and exerted by said clutch springs through said fingers, said bearing, said arm, and said rod, when said clutch disc has become excessively worn,
    (k) a first switch contact supported near the bottom of said cylinder,
    (l) a second switch contact,
    (m) means for resiliently supporting said second contact between said first contact and said piston head and acting in opposition to said rocking spring so as to be thrust into engagement with said first contact by said piston head, said means having a stiffness requiring a force in excess of said predetermined biasing force to overcome it so that said switch will close only when said additional force is exerted on said piston, indicating a worn clutch disc.

4. In a hydraulic clutch system including a set of clutch springs, the combination comprising
    (a) a slave cylinder having an access opening through its bottom wall and a piston mounted for reciprocation in said slave cylinder,
    (b) biasing means coupled to said piston and urging said piston in its rest position toward the bottom of the cylinder with a predetermined force under normal operating conditions, said piston in its rest position being additionally urged toward the bottom of the cylinder by the clutch springs when the clutch is excessively worn or misadjusted, (c) a plug seated in and sealing said cylinder opening, (d) a first electrical contact on said plug, (e) a second electrical contact located for movement toward said first piston contact in response to movement of said piston toward the bottom of said cylinder, (f) means for yieldably separating said second contact from said first contact, said separating means having a yield point which is higher than the force of said biasing means upon said piston, but lower than the sum of forces exerted by said biasing means and by said clutch springs upon said piston so that said separating means will yield and said contacts will engage only when said piston is additionally urged toward the bottom of the cylinder by said clutch springs, and (g) means for electrically connecting said contact members in a common electric circuit outside said cylinder.

5. A hydraulic clutch system including means for detecting excessive clutch disc wear comprising in combination (a) a friction disc and a pressure plate normally biased into engagement by springs, (b) a throw-out bearing mounted on a shaft for movement towards and away from said plate, (c) a plurality of rockably mounted fingers
   (1) anchored to said plate at one of their ends and having their other end normally held closely spaced from said bearing so that when said bearing is moved towards said pressure plate said fingers rock and separate said pressure plate from said disc against the pressure of said springs,
   (2) said fingers being subject to having their free ends levered by said pressure plate against said bearing under the force of said springs when said friction disc becomes excessively worn, (d) a slave cylinder, (e) a piston mounted for longitudinal movement in said cylinder and having a head for forming a pressure chamber with the bottom and wall portions of said cylinder, (f) a source of pressurized fluid communicating with said pressure chamber for urging said piston into an extended position away from the bottom of said cylinder, (g) a connecting rod coupled to said piston, (h) a rockably mounted arm operatively connected between said throw-out bearing and said piston connecting rod for forcing said bearing against said fingers when said piston is in its extended position, (i) biasing means operatively coupled to said arm for rocking said arm so as to maintain said bearing out of contact with said fingers, (j) said piston being normally subject to a predetermined biasing force exerted by said biasing means through said arm and through said rod urging said piston head towards the bottom of said cylinder, said piston also being subject to an additional force urging it towards the bottom of said cylinder and exerted by said clutch springs through said fingers, said bearing, said arm, and said rod, when said clutch disc has become excessively worn, (k) a first electrical contact near the bottom of said cylinder, (l) a second electrical contact located for movement toward said first contact in response to movement of said piston toward the bottom of said cylinder, (m) means for yieldably separating said second contact from said first contact, said separating means having a yield point which is higher than said predetermined biasing force but lower than the sum of said predetermined force and said additional force so that said contacts will engage only when said additional force is exerted on said piston, indicating a worn clutch disc.

6. In a hydraulic clutch system including a set of clutch springs, the combination comprising (a) a slave cylinder and a piston mounted for reciprocation in said slave cylinder, (b) biasing means coupled to said piston and urging said piston in its rest position toward the bottom of the cylinder with a predetermined force under normal operating conditions, said piston in its rest position being additionally urged toward the bottom of the cylinder by the clutch springs when the clutch is excessively worn or misadjusted, and (c) force responsive means for conditionally conducting current mounted near the bottom of said cylinder and extending at least partially into said cylinder for operation by said piston as it approaches cylinder bottom, said means requiring for its operation a force which is greater than that exerted on said piston by said biasing means, but less than that exerted on said piston by said biasing means and said clutch springs together, so that said means is operated by said piston when and only when said piston is urged by the combined forces of said biasing means and said clutch spring, and (d) means for connecting said switch in an electrical circuit outside said cylinder.

7. A hydraulic clutch system including means for detecting excessive clutch disc wear comprising in combination (a) a friction disc and a pressure plate normally biased into engagement by springs, (b) a throw-out bearing mounted on a shaft for movement towards and away from said plate, (c) a plurality of rockably mounted fingers
   (1) anchored to said plate at one of their ends and having their other end normally held closely spaced from said bearing so that when said bearing is moved towards said pressure plate said fingers rock and separate said pressure plate from said disc against the pressure of said springs,
   (2) said fingers being subject to having their free ends levered by said pressure plate against said bearing under the force of said springs when said friction disc becomes excessively worn, (d) a slave cylinder, (e) a piston mounted for longitudinal movement in said cylinder and having a head for forming a pressure chamber with the bottom and wall portions of said cylinder, (f) a source of pressurized fluid communicating with said pressure chamber for urging said piston into an extended position away from the bottom of said cylinder, (g) a connecting rod coupled to said piston, (h) a rockably mounted arm connected between said throw-out bearing and said piston connecting rod for forcing said bearing against said fingers when said piston is in its extended position, (i) biasing means coupled to said arm for rocking said arm so as to maintain said bearing out of contact with said fingers, (j) said piston being normally subject to a predetermined biasing force exerted by said biasing means through said arm and through said rod urging said piston head towards the bottom of said cylinder, said piston also being subject to an additional force urging it towards the bottom of said cylinder and exerted by said clutch springs through said fingers, said bearing, said arm, and said rod, when said clutch disc has become excessively worn, and (k) electrical means for detecting the additional force exerted by said clutch springs on said piston, said electrical means being characterized in that it is not actuated by the normal separation of said friction disc and said pressure plate.

References Cited

UNITED STATES PATENTS

| | | |
|---|---|---|
| 535,264 | 3/1895 | Smith. |
| 1,536,393 | 5/1925 | Hellman. |
| 2,323,489 | 7/1943 | Schmidt et al. |
| 2,852,757 | 9/1958 | Fawick _____ 200—61.41 |
| 2,525,220 | 10/1950 | Hague _____ 192—91 |
| 3,307,667 | 3/1967 | Maurice _____ 192—91 |

BENJAMIN W. WYCHE III, *Primary Examiner.*